(No Model.) 2 Sheets—Sheet 2.
E. J. JERZMANOWSKI.
PROCESS OF AND APPARATUS FOR PRODUCING GAS.
No. 542,855. Patented July 16, 1895.
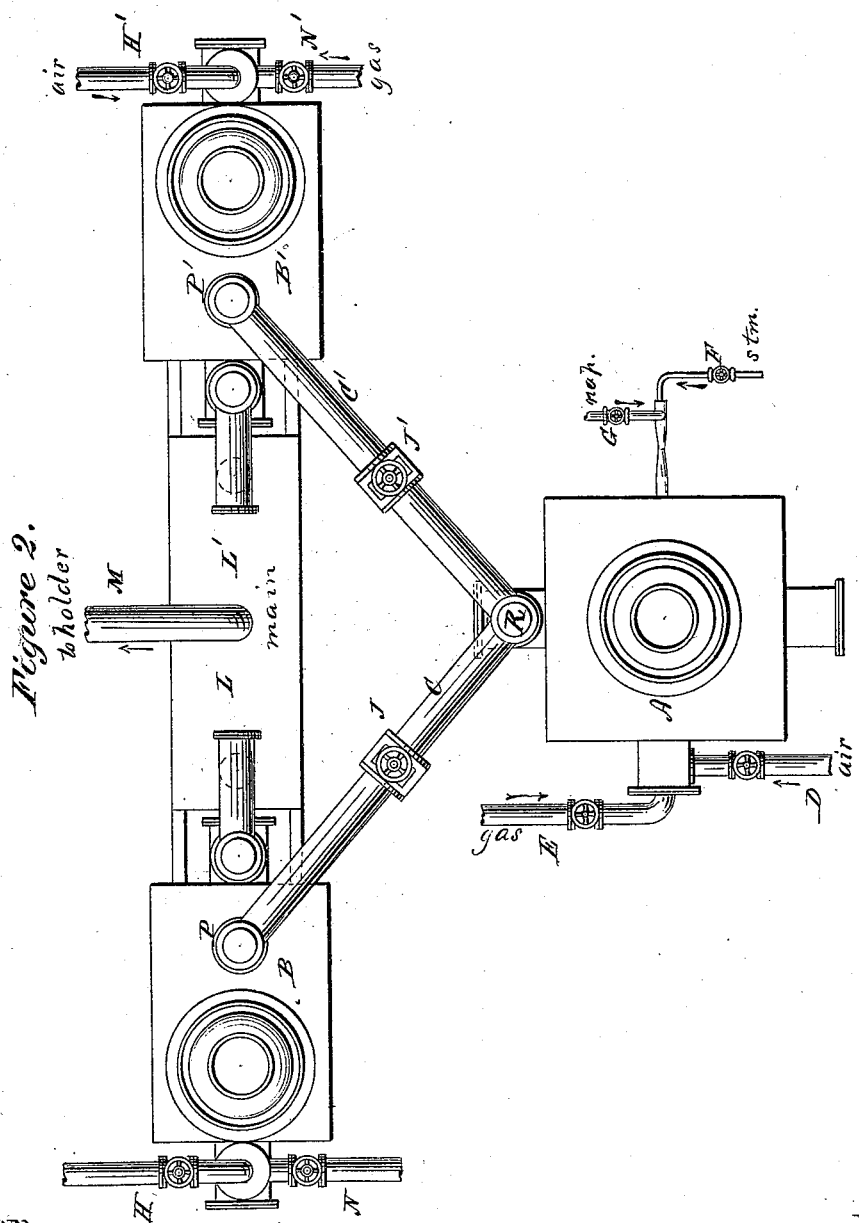

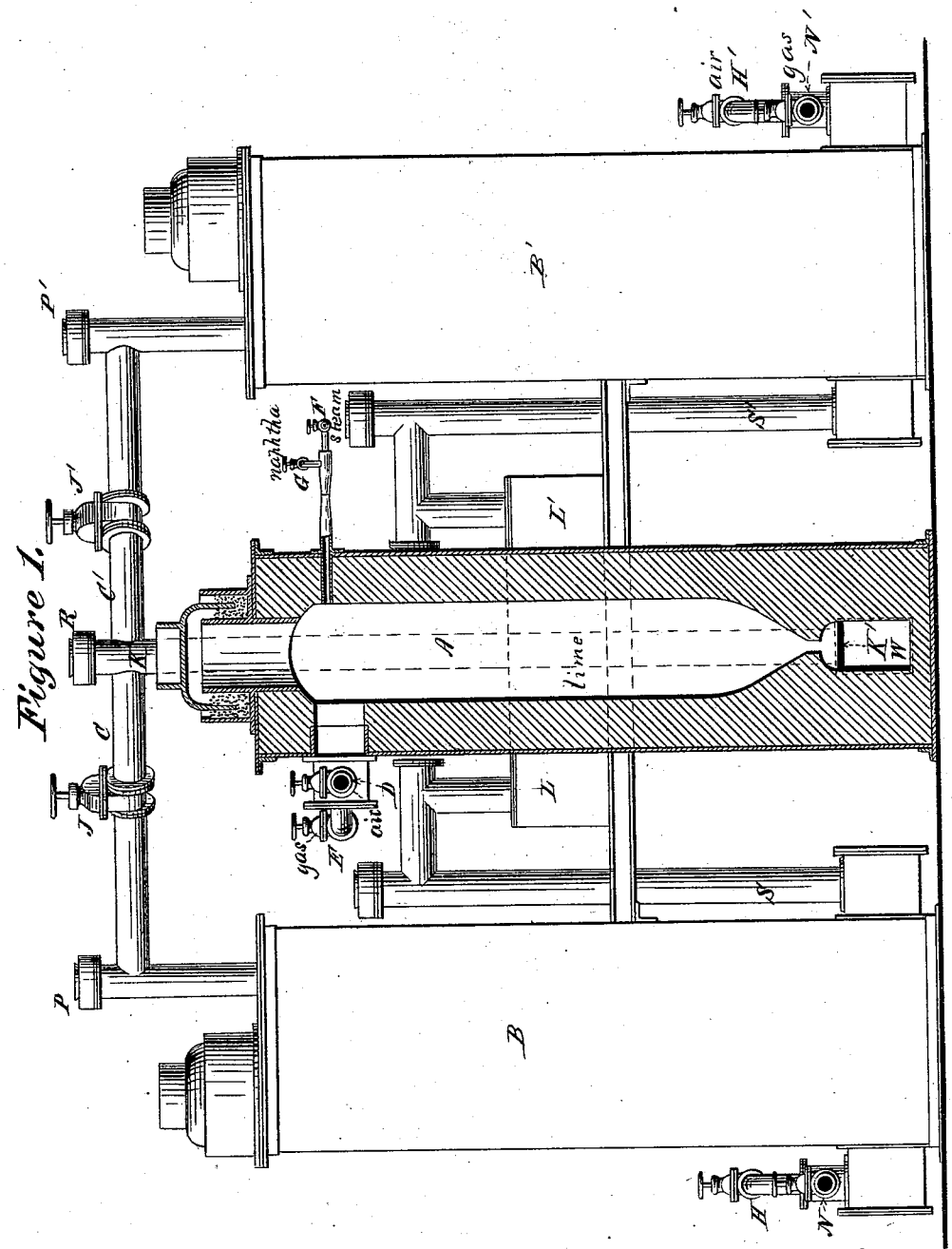

UNITED STATES PATENT OFFICE.

ERAZM J. JERZMANOWSKI, OF NEW YORK, N. Y.

PROCESS OF AND APPARATUS FOR PRODUCING GAS.

SPECIFICATION forming part of Letters Patent No. 542,855, dated July 16, 1895.

Application filed April 3, 1882. Serial No. 57,218. (No model.)

*To all whom it may concern:*

Be it known that I, ERAZM J. JERZMANOWSKI, of the city, county, and State of New York, have invented a new and useful Improvement in Processes of and Apparatus for Producing Hydrogen, of which the following is a full, clear, and exact description, reference being had to the accompanying drawings.

My invention relates to an improvement in the manufacture of hydrogen gas on what is set forth in the patent to C. M. Tessié du Motay, granted on the 29th day of June, 1880, No. 229,338. According to the process, which is fully detailed in said patent, steam, preferably superheated, carrying with it a certain amount of vapor of naphtha or its equivalent is converted in the presence of highly-heated lime, producing substantially pure hydrogen, the carbonic acid being absorbed by cool lime. The cool lime is thereby converted into carbonate of lime, and such carbonate of lime is afterward reconverted into lime by highly heating it. In the patent above referred to the lime-converters are shown as two inverted V-shaped retorts, and the gases are arranged to be thrown through said retorts alternately.

According to my improvement I prefer to separate my lime-converters and to use one converter always to cause the reaction which produces the hydrogen and carbonic acid, and another independent chamber, or there may be two or more of them, to absorb the carbonic acid. The advantages of these two absorbing lime-chambers will be hereinafter fully explained. That which I believe to be new in my apparatus will be specified in the claims hereto annexed.

My invention will be readily understood from the accompanying drawings, in which—

Figure 1 represents an elevation partly in section, and Fig. 2 a plan view.

Only the lime converters and absorbers are shown, the process being fully explained in the Tessié du Motay patent hereinbefore referred to.

Similar letters refer to similar parts.

A represents a vertical lime-chamber in which the primary conversion is to occur.

B B' represent two absorbing lime-chambers. These chambers are connected with the chamber A by the pipes K C C', communicating with the chamber A by the opening K' at the bottom of said chamber. The chambers B B' connect with the hydraulic mains L L' and with the delivery-pipe M leading to the holder. Valves J J' are provided in pipes C C', and other suitable valves, as shown, are provided in the different pipes.

The chamber A is provided at its upper end with the pipes D E, through one of which combustible gas is introduced and through the other of which air is supplied to burn said heating-gas. The chamber A is also provided with the pipes G and F, through which naphtha and steam are injected. The steam-pipe F may be used as an injector to spray the naphtha which enters through the pipe G into the converting-chamber. These pipes D E F G are arranged at the upper part of the lime-chamber A, as shown. The chambers B B' are likewise provided at their bottom with gas-pipes N N' and air-pipes H H'. The pipes C C' are provided with escape or purge valves P P'.

The operation of my apparatus can now be explained. It will be readily understood that it is desirable to have one body of lime at a high temperature and another body of lime at a low temperature, in order to carry out the process properly, and also that these two bodies of lime be continually in a condition to do their proper work in the process. Gas and air are first admitted to the chamber A, and, being consumed in said chamber, the products of combustion pass upward through pipes K' K and escape by the purge-valve P. After the gas and air have been used to heat the lime in the chamber A the resulting products of combustion can be caused to flow through the chamber B or chamber B' for purposes to be explained. After the chamber A has been sufficiently heated the purge-valve R is closed and steam and naphtha are injected into the apparatus through pipes F and G, and a conversion occurs in the presence of hot lime into hydrogen and carbonic acid with some other impurities. The purge-valve R being closed and the valve J opened the carbonic acid and hydrogen pass down and through the absorbing-chamber B, and the carbonic acid is absorbed by the lime in said chamber, which is at a low temperature. The free hydrogen then passes upward through pipe S and hydraulic main L to the main gas-pipe M. The lime in the chamber B is by this process converted into carbonate of lime, and when it has absorbed all the carbonic acid which it can properly take the hydrogen and carbonic acid from the converting-chamber A are caused to flow through the absorbing lime-chamber B'. As soon as this is done air and combustible gas are allowed to flow into the absorbing-chamber B by pipes H and N, and the purge-valve P being opened the combustion in the chamber B drives off again the carbonic acid which escapes by the purge-valve P, converting once more the carbonate of lime into lime. The lime in the chamber B being thus heated and the carbonic acid driven off, the valve in the gas-pipe N may then be closed and air alone be allowed to flow through the chamber B. In this way the temperature therein may, if necessary, be reduced to a sufficiently low degree. The question as to whether such air is or is not to be used will be determined by the number of apparatuses employed and the time which is allowed the absorbing-chambers to cool before they are put into requisition again.

It is obvious that by duplicating the chamber A a continuous process may be carried on, and one combustible gas supply or heating furnace may be used to heat both the converting chamber or chambers A and the absorbing-chambers B B'. I prefer always, however, to have two absorbing-chambers to one converting-chamber; but a sufficient number of absorbing-chambers should always be employed to receive and purify the hydrogen and carbonic acid produced in the converting-chamber A. By arranging the pipes D E F G in the upper part of the converting-chamber A the dust and fine lime particles are driven down and may be removed from the dust-chamber W by opening a suitable door.

I do not claim herein any matter set forth in the Letters Patent to Tessié du Motay, No. 229,338, which sets forth a process in which gases are thrown alternately into one or the other of two converters, my invention being distinguished from that of said Tessié du Motay by the fact that I employ one chamber always for conversion and the second chamber always for purification.

What I claim as my invention, and desire to secure by Letters Patent, is—

1. In an apparatus for producing hydrogen, a converter having feed and discharge pipes in combination with absorbers having discharge pipes, the independent connecting pipes between the converter and the said absorbers, provided with suitable valves, the steam and hydrocarbon supply pipes leading to the converter, means for heating the converter and means for heating the absorbers or purifiers, substantially as specified.

2. The herein described process of producing hydrogen, consisting of, first charging a converter with calcareous material, next passing the products of combustion of combined gas and air through said calcareous material to heat the same, permitting the products of combustion to escape through a suitable valve, next bringing combined steam and naphtha or liquid hydrocarbon into conjunction with said heated calcareous material and passing the resultant gases to and through a body of cooler calcareous material in absorbers, to free the hydrogen contained in said gases from carbonic acid, next passing the free hydrogen from said absorber to a suitable receptacle, next bringing the calcareous material within the absorber to a state of incandescence to expel the carbonic acid, and finally bringing cold air into conjunction with said incandescent calcareous material to cool the same, substantially as described.

ERAZM J. JERZMANOWSKI.

Witnesses:
ANTHONY GREF, Jr.,
GEO. H. EVANS.